United States Patent Office 3,429,721
Patented Feb. 25, 1969

3,429,721
HIGH MELTING POINT GLASS BEADS WITH SHARP MELTING RANGE AND PROCESS FOR MAKING THE SAME
James D. Sproul, House Springs, Mo., assignor to General Steel Industries, Inc., Granite City, Ill., a corporation of Delaware
No Drawing. Filed Oct. 20, 1964, Ser. No. 405,283
U.S. Cl. 106—52       8 Claims
Int. Cl. C03c *3/30, 3/12, 3/04*

ABSTRACT OF THE DISCLOSURE

A glass bead having a high melting point of at least about 1800° F. and a relatively sharp softening range. The glass bead composition consists essentially of about 3.6% to 9.9% metal oxide by weight, about 35.4% to 39.4% of at least one member of the group consisting of an alkali earth oxide and zinc oxide, and about 54.7% to 57.0% silica.

SUMMARY OF THE INVENTION

It is a particular feature of this invention that glass beads of 30 mesh size (U.S. Standard) and larger can be prepared but have relatively high incipient melting points in the order of about 1700° to 2300° F. and higher. These glass beads with the particular composition of this invention have been found to have a relatively sharp softening zone, such that they start to soften only relatively near the melting point so that they do not slump gradually at temperatures approaching the melting point but are self-sustaining. Such glass beads have utility in varying fields, such as use as catalytic agents, heat transfer material at high temperatures, propping agents for catalytic acid processes, and as heat reservoir media.

Essentially, the glass beads of this invention can be produced from compositions having incipient melting temperatures in the range of 1700° to 2300° F. The beads have a composition of about 3.6% to 9.9% weight of an alkali metal oxide, preferably sodium oxide, 35.4% to 39.4% of an alkali earth metal oxide or zinc; oxide, and preferably calcium oxide, and about 54.7% to 57.0% weight silica. This glass bead composition has a much higher softening point than conventional soda lime glass having a melting point in the range of about 1300° F. or below. Such conventional soda lime glass has 13 to 15% sodium oxide, 12½ to 13½% calcium oxide, and 69 to 72% silica.

The glass bead composition of this invention can be made by conventional processes, such as that shown in Bland Patent No. 3,150,947, assigned to Flex-O-Lite Manufacturing Corporation, granted Sept. 29, 1964. The glass beads can be made in any fine size up to relatively large size, such as 30 mesh and above, and preferably in a range of 3 to 10 mesh. This size bead is difficult to produce in vertical stack furnaces, such as that shown in Charles C. Bland Patent No. 2,600,963, issued June 17, 1962, and assigned to Flex-O-Lite Manufacturing Corporation, but the glass beads can be made simply and efficiently using the bead blowing process by contacting a stream of the liquid glass with a blast of compressed air and maintaining the dispersed droplets at a high temperature as illustrated in said Patent No. 3,150,947.

The above features are objects of this invention and further objects will appear in the detailed description which follows.

The glass bead formulations of this invention are characterized by their incipient melting point of about 1700° to 2300° F., and by their sharp softening range up to liquefaction to the desired fluidity for bead blowing. Thus, the range is only about 100° F. between the point where the beads first begin to lose their mechanical stability up to incipient melting of the compositions to liquid glass. After reaching the incipient melting point the glass may be heated to about 300° to 500° additionally to obtain the desired degree of fluidity for bead blowing. This is quite desirable in the glass bead product so that a stable, self-supporting bead is provided which does not slump when subjected to high environmental temperatures, such as employment as heat transfer media or as catalytic agents in chemical processes.

In the glass bead formulation, the alkali metal oxide is preferably sodium oxide used in the amount of about 3.6% to 9.9% by weight. The sodium oxide acts as a glass making flux constituent, but other alkali metal oxides, such as potassium oxide and lithium oxide may also be employed satisfactorily by substitution either in part or in total.

The alkaline earth oxide is preferably calcium oxide employed in the range of about 35.4% to 39.4% by weight. It will be understood, however, that other alkaline earth oxides, such as magnesium oxide, strontium oxide, and barium oxide can be employed. Zinc oxide, although not an alkaline earth oxide, has also been found to be useful, and these additional oxides can be used to replace in part or in total the calcium oxide as glass making fluxing agents. Where a combination of these oxides is employed, melting may be facilitated and the alkali metal oxide may in some circumstances be obviated.

The silica employed in the glass composition is in the amount of about 54.7% to 57.0% by weight. The reduction of silica over that conventionally employed in soda lime glass, previously described, is believed to aid in the creation and maintenance of a sharp softening point. Conventional soda lime glass, generally employing a higher percentage of silica, is a good deal more viscous than the glass composition of this invention and has a substantially greater softening range, which is obviated by the instant composition. The high percent of silica in the conventional soda lime glass causes a softening and viscosity much like taffy over a wide softening range which is avoided by the compositions of this invention. Further, the ultimate liquid conventional soda lime glass is more viscous than the instant compositions and does not lend itself to bead blowing production processes as well as the compositions of this invention.

The glass making composition of this invention provides, when melted, a liquid glass of a good degree of fluidity. This is important in the manufacture of glass beads and the composition can be very readily employed in making beads according to the bead blowing process fully described in Patent No. 3,150,947. This type of process is employed in the manufacture of these beads and particularly to make beads of 30 mesh and larger in size. The size of 3 to 10 mesh has been found to be particularly desirable and requires the bead blowing process, since these beads are somewhat heavy for the vertical stack process in Bland Patent No. 2,600,963.

In this process as fully described in the patent, the glass charge is melted to provide a liquid glass composition which is then dispensed in a stream such as a free falling stream. The stream is then contacted by a blast of compressed gas, such as air, and the path of the dispersed droplets is maintained at a high temperature, such as by the creation of an enveloping gas flame. The dispersed droplets are maintained at this high temperature and the beads are shaped to a substantially spherical form by surface tension, and after being carried into a relatively cooler space, they are solidified in space and then collected, as is well understood in the art.

It will be understood that to provide the glass bead compositions of this invention, the alkaline earth oxide and alkali metal oxides may be used either as oxides as such or in the form of carbonates or hydroxides or complex alkali metal-silico-halides, since, when melted together in the glass charge composition, they form the ultimate oxides of the glass composition.

There will be listed below various compositions that can be employed in this invention. In Example 1 below there is listed a preferred example which can be employed to provide glass beads of 5 to 7 mesh size and other ranges. This composition has an incipient melting point at about 2100° F. and has a sharp softening range of only about 100° F., so that it is rigid and self-supporting up to about 2000° F. The liquid glass composition when melted is of a good degree of fluidity and lends itself to production by the afore-mentioned bead blowing process.

EXAMPLE 1

| | Charge in parts by weight | Glass composition in percent by weight |
|---|---|---|
| $Na_2CO_3$ | 12 | 7 $Na_2O$. |
| $CaCO_3$ | 68 | 38 CaO. |
| $SiO_2$ | 55 | 55 $SiO_2$. |

In Example 3 below the glass composition has a de- that has a slightly greater viscosity but still is satisfactory for bead blowing and has a slightly higher incipient melting point of about 2200° F.

EXAMPLE 2

| | Charge in parts by weight | Glass composition in percent by weight |
|---|---|---|
| $Na_2CO_3$ | 10 | 5.9 |
| $CaCO_3$ | 68 | 38.5 |
| $SiO_2$ | 55 | 55.6 |

In 8xample 3 below the glass composition has a desirable viscosity suitable for bead blowing, but has a slightly lower incipient melting point of about 2050° F.

EXAMPLE 3

| | Charge in parts by weight | Glass composition in percent by weight |
|---|---|---|
| $Na_2CO_3$ | 17.1 | 9.9 $Na_2O$. |
| $CaCO_3$ | 62.5 | 35.4 CaO. |
| $SiO_2$ | 55 | 54.7 $SiO_2$. |

In Example 4 below the viscosity is desirable for bead blowing and the incipient melting point has been increased to about 2270° F.

EXAMPLE 4

| | Charge in parts by weight | Glass composition in percent by weight |
|---|---|---|
| $Na_2CO_3$ | 8 | 4.9 |
| $CaCO_3$ | 68 | 38.9 |
| $SiO_2$ | 55 | 56.2 |

In Example 5 below the viscosity is still proper for bead blowing but has been increased somewhat so that it is not quite so desirable as the aforementioned examples. The incipient melting point has been increased to about 2300° F.

EXAMPLE 5

| | Charge in parts by weight | Glass composition in percent by weight |
|---|---|---|
| $Na_2CO_3$ | 6 | 3.6 |
| $CaCO_3$ | 68 | 39.4 |
| $SiO_2$ | 55 | 57 |

It will be understood that various changes and modifications may be made in the composition and method of this invention as will be readily apparent to those skilled in the art. Such changes and modifications are within the scope and teaching of this invention as defined by the claims appended hereto.

What is claimed is:

1. A glass bead characterized by a high melting point and a relatively sharp softening range, said bead having a composition consisting essentially of about 3.6% to 9.9% alkali metal oxide by weight, about 35.4% to 39.4% of at least one member of the group consisting of an alkali earth oxide and zinc oxide, and about 54.7% to 57.0% silica.

2. A glass bead characterized by a high melting point and a relatively sharp softening range, said bead having a composition consisting essentially of about 3.6% to 9.9% sodium oxide, about 35.4% to 39.4% calcium oxide, and about 54.7% to 57.0% silica.

3. A glass bead characterized by a high melting point and a relatively sharp softening range, said bead having a composition consisting essentially of about 7% sodium oxide by weight, about 38% calcium oxide and about 55% silica, said bead being at least of a size retained on a 30 mesh screen and having a melting point of at least about 1800° F.

4. A glass bead characterized by a high melting point and a relatively sharp softening range, said bead having a composition consisting essentially of about 7% sodium oxide by weight, about 38% calcium oxide and about 55% silica.

5. A process for making glass beads characterized by a high melting point and a relatively sharp softening range which comprises melting a composition providing about 3.6% to 9.9% alkali metal oxide by weight, about 35.4% to 39.4% of at least one member of the group consisting of an alkali earth oxide and zinc oxide, and about 54.7% to 57.0% silica, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same.

6. A process for making glass beads having a size retained on a 30 mesh screen characterized by a high melting point and a relatively sharp softening range which comprises melting a composition providing about 3.6% to 9.9% sodium oxide, about 35.4% to 39.4% calcium oxide and about 54.7% to 57.0% silica, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same.

7. A process for making glass beads having a size retained on a 30 mesh screen characterized by a high melting point and a relatively sharp softening range which comprises melting a composition providing about 7% sodium oxide by weight, about 38% calcium oxide and about 55% silica, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same, said bead being at least of a size retained on a 30 mesh screen and having a melting point of at least about 1800° F.

8. A process for making glass beads having a size retained on a 30 mesh screen characterized by a high melting point and a relatively sharp softening range which comprises melting a composition providing about 7% sodium oxide by weight, about 38% calcium oxide and about 55% silica, contacting a liquid stream of said composition by a blast of compressed gas and dispersing said liquid stream into a path of molten droplets of glass, maintaining a high temperature in said path and substantially cooling said droplets to glass beads in space to allow surface tension to shape the droplets to solidified glass beads and collecting the same.

References Cited

UNITED STATES PATENTS

| 2,965,921 | 12/1960 | Bland | 65—142 |
| 3,071,480 | 1/1963 | Searight et al. | 106—52 |
| 3,294,511 | 12/1966 | Hess | 65—142 |

HELEN M. McCARTHY, *Primary Examiner.*

W. R. SATTERFIELD, *Assistant Examiner.*

U.S. Cl. X.R.

65—21, 142